Patented Dec. 6, 1932

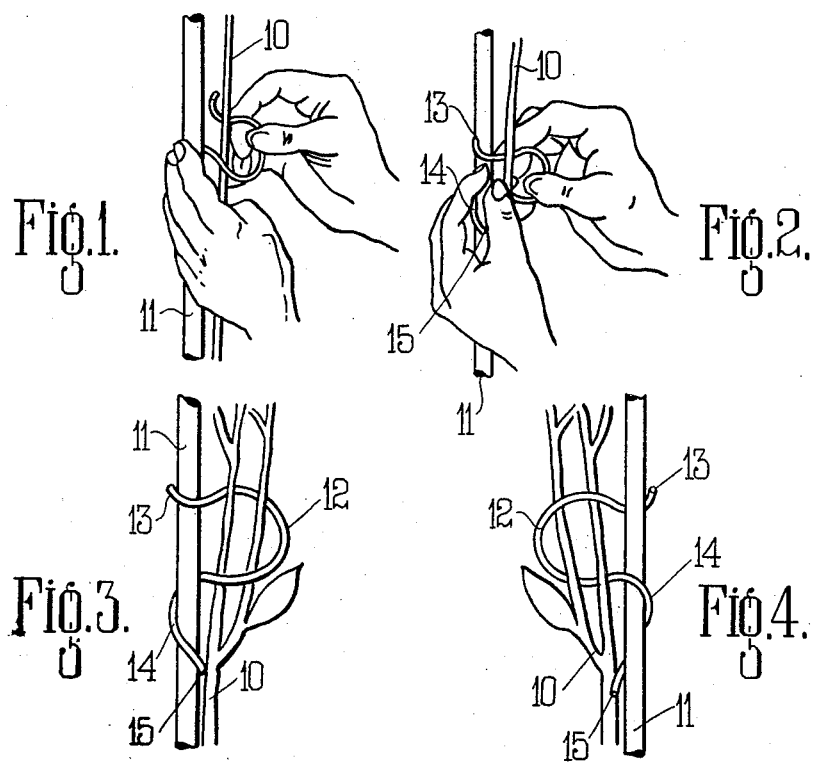

1,890,217

UNITED STATES PATENT OFFICE

HARRY DOBBINS, OF SANKEY, NEAR WARRINGTON, ENGLAND, ASSIGNOR TO TILLING GRAY AND COMPANY LIMITED, OF WARRINGTON, ENGLAND, A BRITISH COMPANY

SPRING CLIP PLANT SUPPORT

Application filed June 12, 1931, Serial No. 543,990, and in England June 18, 1930.

The present invention relates to spring clips, and more particularly to clips adapted to be connected to sticks and having a loop through which growing plants are inserted for the support of these by the stick.

Normally, clips of this type take the form substantially of a figure 8, i. e. they have two complete loops, one loop encircling the flower and the other loop encircling the stick. With this construction, however, a disadvantage exists that the clip is only suitable with a stick of a given thickness.

The object of the present invention is to provide a clip which may be applied to sticks of varying diameters or thicknesses within predetermined limits.

According to the present invention a spring clip is forced by a piece of wire or the like resilient material in the form of a loop one end of which is adapted to be wound around the stick to engage with opposite sides of the stick at displaced longitudinal parts of this, whilst the other end of the loop engages with one side of the stick only.

From another aspect of the invention one end of the loop is passed around the stick in the manner of a spiral whilst the other end of the loop which is preferably displaced longitudinally of the stick relatively to the first end is passed around part of the perimeter of the stick only.

Again, that end of the loop which is wound around the stick in the form of a spiral is preferably of larger pitch than the other end of the loop.

Thus, in effect, the spring clip is substantially in the form of a figure 8 in plan view with one end of the clip displaced longitudinally of the other end and terminating at a substantially diametrically opposed part of the periphery of the stick to that of the other end.

By causing the ends of the loop where these engage with the stick to be displaced longitudinally of the stick the loop in effect is an open loop which in elevation is substantially in the form of a spiral, that is to say a space is left between the ends of the loop for the purpose of readily passing the loop around the plant stem at the time of supporting this by a stick.

The invention is more particularly described with reference to the accompanying drawing, in which:—

Figure 1 is a view showing the loop of the spring clip passed around the stem of the plant to be supported and about to be engaged with the supporting stick.

Figure 2 is a view showing the completion of the assembly of the loop on the stick.

Figure 3 is a view of the spring clip when supporting the plant with both ends of the loop in position.

Figure 4 is a view from the opposite side of the stick to that shown in Figure 3.

In the construction according to the drawing a growing plant to be supported is illustrated at 10 and the supporting stick at 11. The clip consists of a loop 12 having ends 13 and 14. It will be noticed that the end 13 passes around one side of the stick 11 only, i. e. it is in the form of a helix of substantially half a turn, whilst the end 14 of larger pitch passes around the stick 11 substantially in the form of a spiral to engage with both sides of the stick, the extreme end 15 of the part 14 engaging with that side of the stick engaged by the end 13 of the loop, i. e. the end 14 is also in the form of a helix of at least half a turn but preferably a complete turn.

The pitch of the helix of the end 14 is opposite to that of the helix of the end 13. If desired the pitch of the end 14 may be of an increasing nature towards the actual end.

Further it will be noticed from the drawing that the loop 12 is an open one prior to assembly on the stick so that it can readily be passed around the stem of the growing plant as shown in Figure 1.

In order to fix the clip on the stick to support the growing plant the loop 12 is passed around the stem or stems of the plant, the end 14 is then passed around the stick 11 whereupon the end 13, due to the resiliency of the clip is forced around the stick as shown in Figure 2 of the drawing.

In the position shown in Figures 2 and 3 the clip by reason of its resiliency is firmly gripped on the stick, which, it will be appreciated, may be of varying diameters or of varying shapes in cross section.

I declare that what I claim is:—

A support for growing plants comprising a vertical stake and a spring clip formed from a piece of wire consisting of an open loop in the form of a helix the axis of which is parallel to that of the stake, one end of said loop also being of open helical form and passing around said stake to engage therewith at displaced longitudinal parts of said stake and the other end of said loop being in the form of a half convolution helix of opposite curvature to said first mentioned end and engaging only with the opposite side of said stake to that which is engaged by the inner half convolution of said first mentioned end.

In witness whereof, I have hereunto signed my name this 26th day of May, 1931.

HARRY DOBBINS.